(No Model.) 3 Sheets—Sheet 1.
R. C. ANDERSEN.
ELEVATOR.
No. 434,372. Patented Aug. 12, 1890.
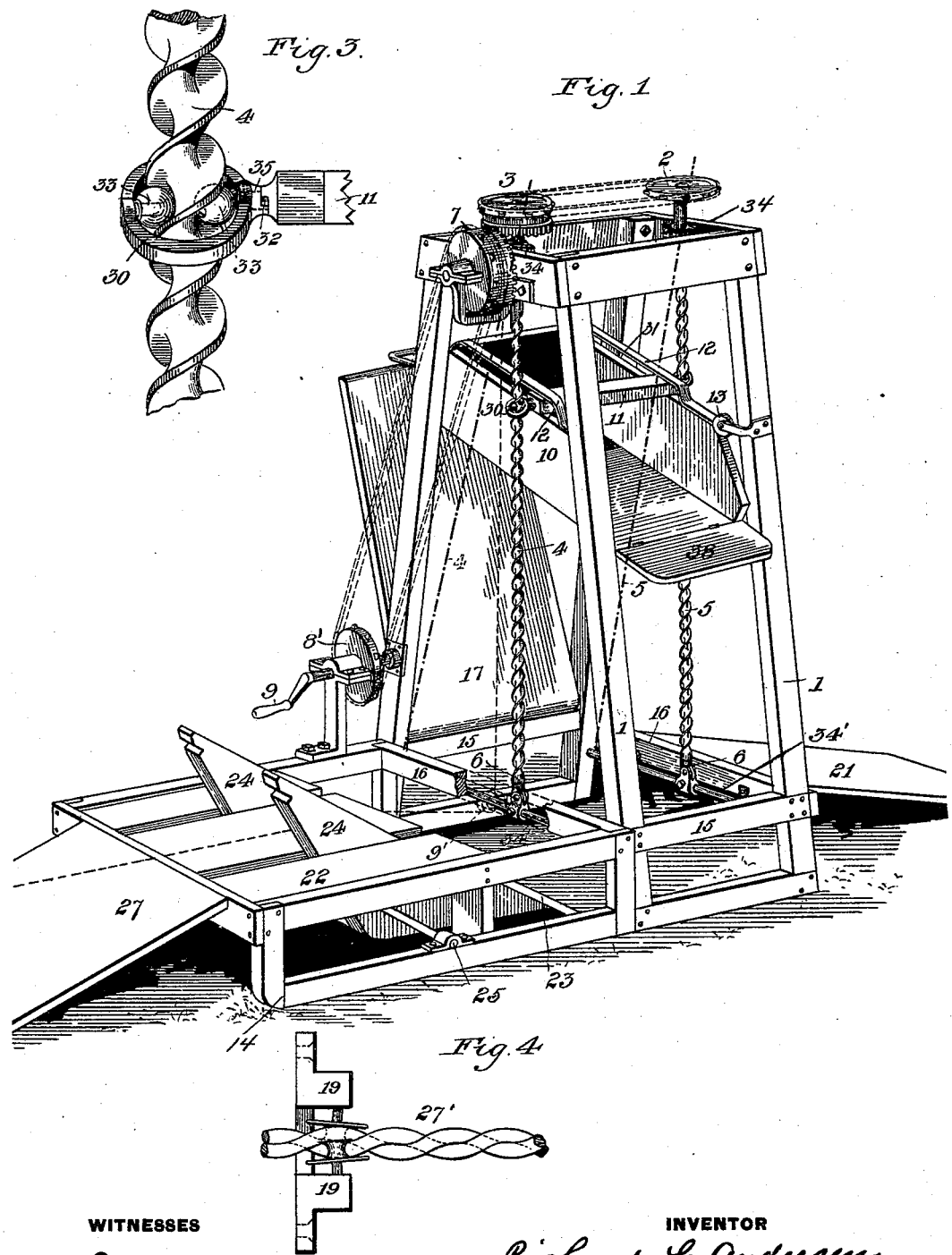
WITNESSES
INVENTOR
Richard C Andersen
by Benj. R. Catlin (No Model.) 3 Sheets—Sheet 2.
R. C. ANDERSEN.
ELEVATOR.
No. 434,372. Patented Aug. 12, 1890.
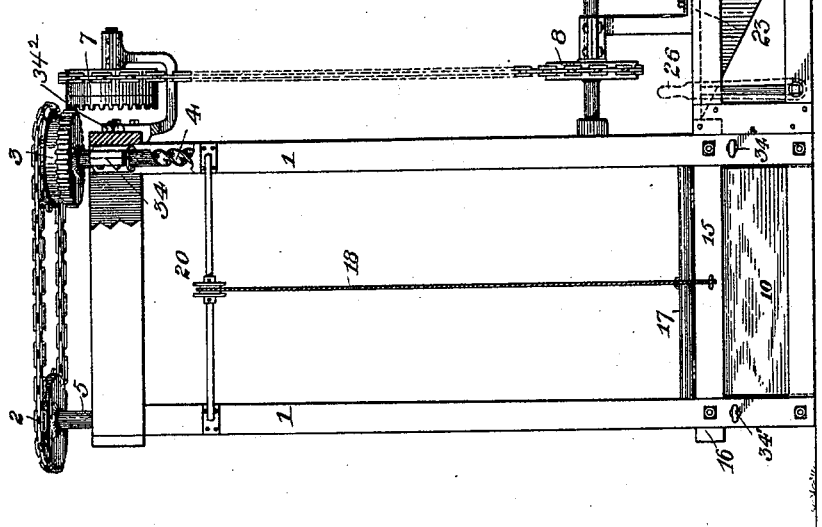

(No Model.) 3 Sheets—Sheet 3.

R. C. ANDERSEN.
ELEVATOR.

No. 434,372. Patented Aug. 12, 1890.

WITNESSES
L. A. Conner
Edward Cashman

INVENTOR
Richard C. Andersen
by Benj. R. Catlin

UNITED STATES PATENT OFFICE.

RICHARD C. ANDERSEN, OF PAWNEE CITY, NEBRASKA.

ELEVATOR.

SPECIFICATION forming part of Letters Patent No. 434,372, dated August 12, 1890.

Application filed December 14, 1889. Serial No. 333,764. (No model.)

*To all whom it may concern:*

Be it known that I, RICHARD C. ANDERSEN, a resident of Pawnee City, in the county of Pawnee and State of Nebraska, have invented certain new and useful Improvements in Elevators; and I do hereby declare the following to be a full, clear, and exact description of the invention, such as will enable others skilled in the art to which it pertains to make and use the same.

The object of the invention is to provide a portable elevator suitable for transferring the contents of wagons into cribs or bins and for like purposes; and it consists in the matters hereinafter described and particularly pointed out.

Figure 5:
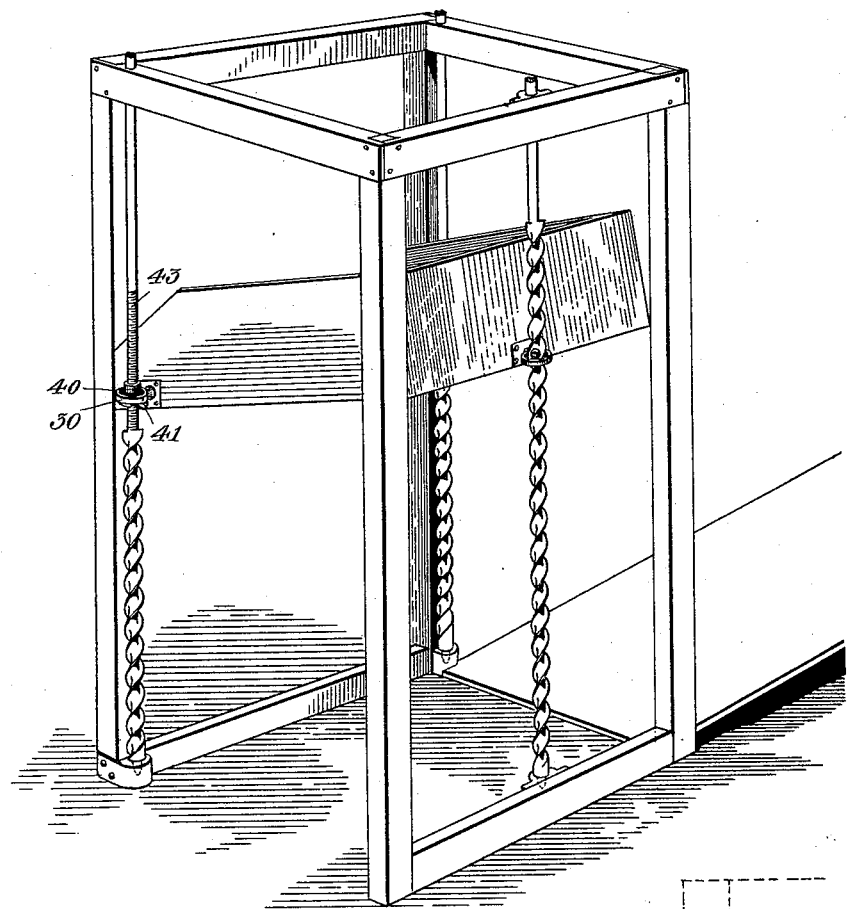
Figure 6:
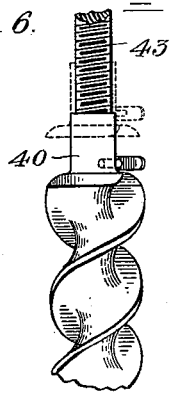
Figure 7:
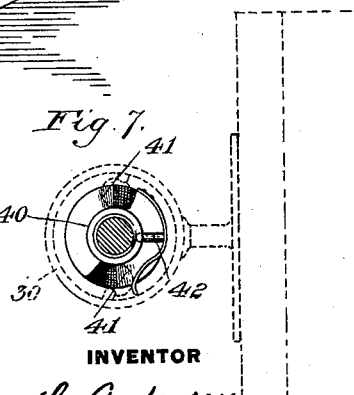

In the drawings, Figure 1 is a perspective view of the elevator. Fig. 2 is a front elevation. Fig. 3 is a view of a section of the elevating-screw and a traveling device connected thereto; and Fig. 4 is a plan of screw and traveling device for moving the elevator-frame. Fig. 5 is a perspective of modified devices for tilting the elevator-box, the gearing, runners, and other parts being broken away or omitted. Fig. 6 is a sectional side elevation of a modification of the elevating-screws, and Fig. 7 a plan of the same. Fig. 8 is an enlarged view of the foot of a screw and its bearings, and Fig. 9 is a view of a modification of the bearing.

The elevator-frame 1 supports two sprocket or chain wheels 2 and 3, the axes of which are connected with or prolonged in the screws 4 and 5, which extend through pivoted or tilting bearings 34 down to the base of the frame, where they are stepped in movable sockets 6. These sockets are secured to rods 34', the handles of which are shown extending through the frame-posts in Fig. 2, and by these handles the rods can be moved to carry the screws to the position indicated by dotted lines in Fig. 1. In Fig. 9 is shown a modified support for the foot of each screw, consisting of a V-shaped trough 45, secured in a cross-piece of the frame and having in its bottom a depression or bearing 44. The foot of each screw can be slipped out of its seat and along the trough by the hand or in any convenient manner. The wheel 3 is provided with a bevel-gear meshing with a gear-wheel 7, supported by a horizontal stud projecting from the frame. This latter wheel is also constructed to receive power by a chain, which is moved by sprocket-wheel 8, journaled, as shown, and driven by a crank 9. The wheels 2 and 3 may be driven by horse-power or by any convenient motor through the medium of a rope or chain passed about wheel 7, and then extended down and around a pulley, as at 8'.

10 indicates a box-like receptacle or elevating grain-holder, which is suspended from the screws 4 and 5 by means of a bar 11, situated under the plates 12, which latter are secured at their ends to the elevating-box to produce the slots 31. This bar is provided at its end with rings 30. These rings are arranged to embrace the vertical screws, and they engage the inclined planes of the screws by means of friction-balls 33, journaled upon the studs extending inwardly and radially from the inner surface of the rings, the construction being such that when the screws are revolved the balls roll upon the inclines, and the rings and the bar 11, to which they are attached, move up or down according to the direction of the revolution. The bar 11 can partially turn upon the projection 35, and is provided with stops 32, consisting of the walls of a slot or their equivalent to limit the movement of the projection 35, cast on the ring. This or a like construction is used to prevent the bar from turning more than a predetermined distance in either direction. The bar being thus prevented from turning more than a few degrees, the box or receptacle is also kept from tipping too far by said bar, which is rectangular in cross-section and is confined between the plates 12 and the side walls of the box.

If the screws be turned by means of the wheels 2 and 3 they will raise the tilting bar 11 and also the receptacle 10. If the box is thus raised until it strikes a stop, such as 13, it will be tilted by the continued movement of the bar 11 on the screws, which movement will carry the opposite end of the box upwardly, while the stop hinders such movement at the end where it is located. Such tilting of the elevator box or receptacle is provided to discharge its contents when it has reached a suitable elevation, excessive tipping of the box in either direction being prevented by stops 32, as stated.

38 denotes a hinged door, which can be supplied, if desired, and which may be dropped at the proper time to permit the free discharge of the contents of the elevator-box.

The grain or lading is dropped from a wagon to the elevator-box by the following means: Said box is lowered to the level of the runners 14 14, and below the bars 15 16 of the frame by the means above set forth, and the door 17, hinged to one of the bars 15, is lowered by means of a cord 18, passing around pulley 20 down upon the top of the box or upon other suitable support. The screws are then drawn to one side, as indicated by broken lines in Fig. 1, by means of rods 34', which move the sockets in which rests the foot of each screw. If the modified form shown in Fig. 9 be used, they may be moved by analogous means or by hand. The inclined platform 21 being in place, a loaded wagon is drawn up it and across the closed trap-door 17 onto the platform 22, so that its rear wheels rest upon connecting plank or bar 23 and upon the tilting blocks 24, which blocks are supported upon a shaft having bearings 25 in the runners or in the platform-frame, and which blocks may be dropped or tilted by means of a cranked lowering-lever 26, so as to lower the rear end of the wagon and permit the easy transfer of its contents to the elevator-box, which at this stage of the operation is uncovered, the door 17 having been raised. The load having been transferred to the elevator-box, it is raised, tilted, and its contents discharged, as above described. When the empty wagon is started forward by the team which passes down the inclined plane 27, it depresses the outer ends of the blocks 24 and raises their opposite ends and the connected plank 23, and they can at this time be chocked or supported by the lever 26.

Fig. 5, in which the gearing and connections and also the runners or shoes and other parts are omitted or broken away, shows an arrangement of screws for raising and positively tilting the elevator-box. One of these is connected with the rear of the box by a ring and bearing wheels or balls, such as illustrated in Fig. 3, and two others are similarly connected with the front of the box, one on each side. The latter screws have the same pitch as the first named, and are suitable for raising the box by the revolution of the screws to or near the desired height; but at or a little below such point the size and pitch of the two front screws are decidedly lessened, and they are provided with an interiorly-screw-threaded nut 40, having exterior spirals 41, which form continuations of the spirals of the main or larger part of the screws, so that the friction wheels or balls of the ring can readily pass from one to the other, the nuts 40 being at the bottom of the small screws and their exterior threads or spirals being adjacent to and continuous with the threads of the large screws. These nuts 40 are locked in this position by the spring-actuated pins 42, which pins are released by the friction-wheels of the rings 30, when the revolution of the screws move them up onto the spirals of nut 40 and between them and the springs, which are thereby forced away from the nuts, withdrawing the locking-pins from their seats in the inner or smaller screws 43. As soon as said pins are disengaged from the holes in 43, the nuts 40 are free to rise on the screws 43, and are compelled so to do by the revolution of the screws, being themselves held from rotation by their connection with the fixed rings 30. The ascent of the nuts on the small screws and consequently of the rings and the front end of the box will be very small and much less than that of the rear end, by which means the box is tilted and can be emptied. The reverse action of these screws returns the box to a level position and lowers it to receive a new load. It will of course be understood that these screws are driven by means substantially such as above described, and that the modified means for tilting can be used with the other parts of the invention herein set forth, except that it will be unnecessary to withdraw the screws to one side to allow the passage of a wagon, as in the modified arrangement they are permanently located out of the way.

In Fig. 2 is shown a screw 27', conveniently formed by twisting together two rods, which screw engages a device 19, having a general resemblance to those before described in connection with the tilting bar 11, which device is affixed to the platform-frame. It consists, essentially, of two pulleys, each formed to receive in its groove one of the rods composing the screw. (See Fig. 4.) The pulleys revolve upon studs or journals fixed to the aforesaid plate 19 and bent at a proper angle. They are oppositely placed, embracing each a different part or member composing the screws. They travel upon the screw when it is revolved, and being fixed to the elevator-frame will draw it after them. The outer end of the screw 27' is held against movement toward the elevator-frame by the posts and bar or anchor 28', secured in fixed position in any suitable manner, and a lever 29 is attached thereto, by which it may be turned with the effect to draw the elevator and its runners in the direction of the outer end of the screw, as already stated, whereby the elevator can be moved from place to place as desired.

The above-described apparatus is comparatively simple and is very efficient and convenient in operation.

By means of the gears and screw a small power can be used to raise the load, however heavy, and the horizontal screw enables us to readily move the elevator from one point to another.

Having thus described my invention, what I desire to secure by Letters Patent, is—

1. The combination of the elevator-box with the screw engaging its rear end and with screws engaging its forward end, the last-mentioned screws being provided at their upper portions with threads of comparatively small pitch, and devices for transferring the front end of the box to and from said parts of the screws having a reduced pitch, substantially as set forth.

2. The combination of the screw 27', a lever for turning it, means for holding it against lengthwise movement, and pulleys affixed to the elevator-frame, each engaging a threaded screw, whereby the elevator may be drawn along, substantially as set forth.

3. In an apparatus for elevating grain or other substances, the combination of the frame, two gear-wheels supported on said frame and having their axes prolonged or continuous with screws, and the traveling devices provided with friction-rollers adapted to move on the inclines of the screws, said devices being connected to a bar to carry the load, the bar and the traveling devices having a loose connection circumferentially of the bar, and stops to limit the circumferential movement, substantially as set forth.

4. In an apparatus for elevating grain or other substances, the combination of the frame, two gear-wheels supported on said frame and having their axes prolonged or continuous with screws, and the traveling devices provided with friction-rollers adapted to move on the inclines of the screws, said devices being connected to a bar to carry the load, the bar and the traveling devices having a loose connection circumferentially of the bar, and stops to limit the circumferential movement, and an elevator-box, substantially as set forth.

In testimony whereof I have signed this specification in the presence of two subscribing witnesses.

RICHARD C. ANDERSEN.

Witnesses:
C. T. BUTLER,
JOHN COLLIER.